United States Patent [19]
Roach

[11] Patent Number: 5,975,257
[45] Date of Patent: Nov. 2, 1999

[54] METHOD AND APPARATUS FOR SEPARATING STEERING OIL AND BRAKE COOLING OIL WITHIN A HYDRAULIC TANK

[75] Inventor: Patrick Gray Roach, Groveland, Ill.

[73] Assignee: Komatsu Mining Systems Inc., Vernon Hills, Ill.

[21] Appl. No.: 08/879,091

[22] Filed: Jun. 19, 1997

Related U.S. Application Data

[60] Provisional application No. 60/025,445, Sep. 4, 1996.

[51] Int. Cl.$^6$ ............................. F16D 65/78; F16D 31/02
[52] U.S. Cl. ..................... 188/264 F; 60/456; 188/264 P
[58] Field of Search ................... 188/264 CC, 264 D, 188/264 F, 264 P, 264 R; 60/456

[56] References Cited

U.S. PATENT DOCUMENTS

| | | | |
|---|---|---|---|
| 1,235,438 | 7/1917 | Chynoweth . | |
| 3,945,208 | 3/1976 | O'Connor | 60/453 |
| 3,959,141 | 5/1976 | Johnson | 210/132 |
| 3,994,812 | 11/1976 | Nilsson | 210/172 |
| 4,146,102 | 3/1979 | Balzer | 180/6.7 |
| 4,174,018 | 11/1979 | Liebert et al. | 180/132 |
| 4,196,589 | 4/1980 | Kato | 60/456 |
| 4,202,453 | 5/1980 | Wilkes, Jr. et al. | 212/55 |
| 4,485,444 | 11/1984 | Maruyama et al. | 364/426.01 |
| 4,517,800 | 5/1985 | Karakawa et al. | 60/237 |
| 4,877,104 | 10/1989 | Morrison | 180/308 |
| 5,507,360 | 4/1996 | Simmons | 180/133 |

*Primary Examiner*—Chris Schwartz
*Attorney, Agent, or Firm*—Edward G. Fiorito

[57] ABSTRACT

The present invention provides a hydraulic fluid tank assembly for a vehicle having a hydraulic brake cooling circuit and a hydraulic steering circuit. The hydraulic tank assembly includes a hydraulic tank that has a brake cooling section fluidically coupled to the hydraulic brake cooling circuit of a vehicle and a steering section fluidically coupled to the hydraulic steering circuit of a vehicle. The steering section further is fluidically coupled to the brake cooling section such that hydraulic fluid may flow between the brake cooling section and the steering section of the hydraulic tank. A barrier plate disposed in the tank separates the brake cooling section from the steering section. The barrier plate has a through hole that fluidically couples the brake cooling section with the steering section; and a hydraulic fluid strainer is disposed in the through hole of the barrier plate in order to strain hydraulic fluid that flows between the brake cooling section and the steering section.

19 Claims, 10 Drawing Sheets

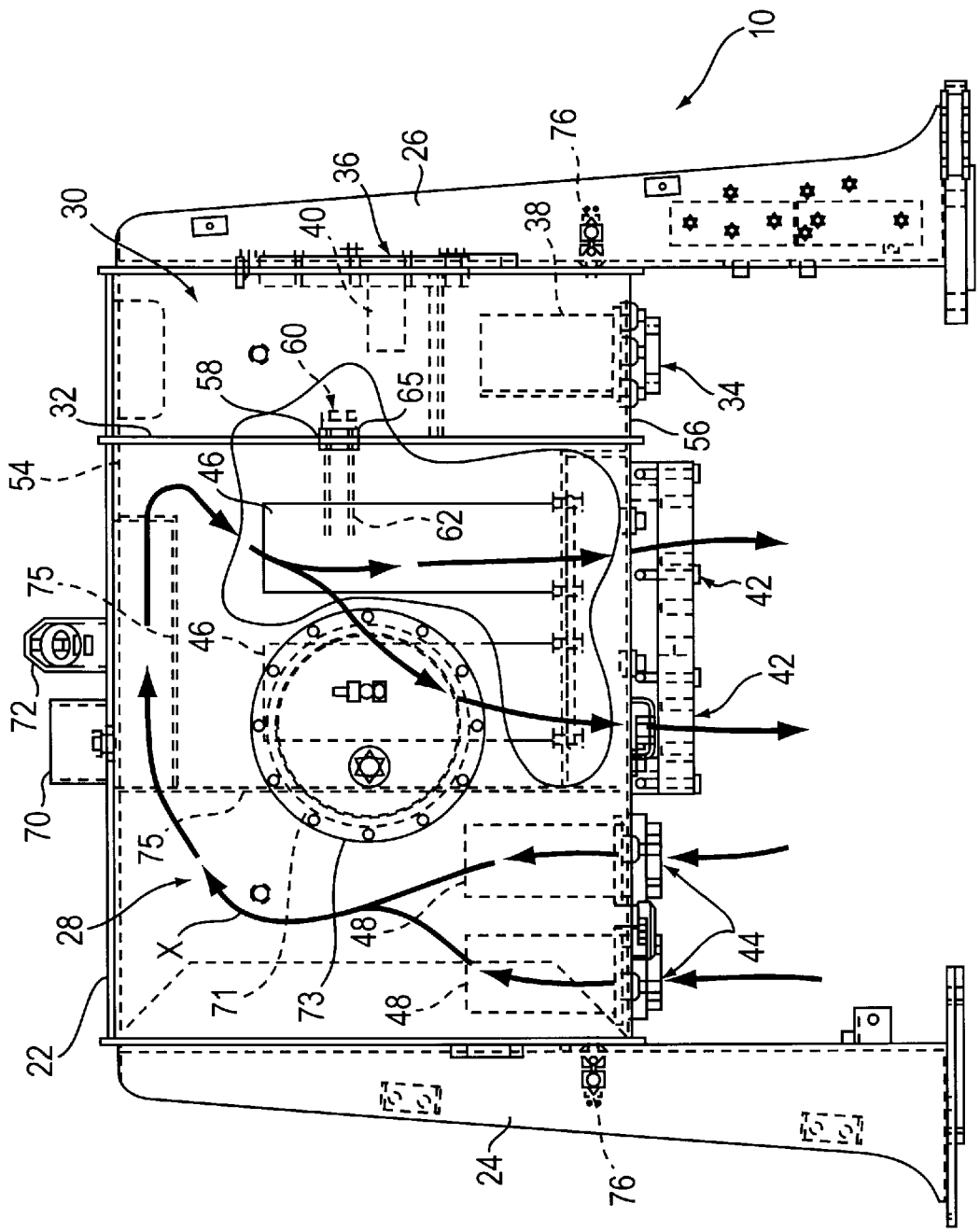

METHOD AND APPARATUS FOR SEPARATING STEERING OIL AND BRAKE COOLING OIL WITHIN A HYDRAULIC TANK

CROSS-REFERENCE TO RELATED APPLICATION

This application claims the benefits of U.S. Provisional Patent Application No. 60/025,445, filed Sep. 4, 1996.

BACKGROUND OF THE INVENTION

The present invention relates to an improved hydraulic oil tank that provides hydraulic oil to both the steering and brake cooling systems of a vehicle, such as a dump truck. In particular, the invention relates to a hydraulic tank that has two separate hydraulic oil environments, one for supplying steering oil and one for providing brake cooling oil, that share common oil.

Hydraulic systems for the steering and brake systems of a truck typically have either a totally common hydraulic tank that supplies both the steering and brake cooling oil to the steering and brake systems or two totally separate hydraulic tanks, one for the steering system and one for the brake cooling system.

Systems that employ a totally common hydraulic tank, however, risk having contaminants from the brake cooling oil enter the hydraulic steering system or circuit and cause a steering failure. Contamination of the brake cooling oil can result from brake wear or from a catastrophic brake failure. Some systems have hydraulic oil filters positioned in the hydraulic circuit between the brakes and the hydraulic tank for filtering contaminants from the brake cooling oil. However, these filters can become over saturated so that contaminated oil is able to bypass the filter.

Whereas the use of two totally separate hydraulic tanks can prevent contaminated brake cooling oil from entering the steering oil circuit and causing a steering failure, it can also be costly to implement. Furthermore, over time the volume of oil in the steering circuit may decrease due to leakage of oil across the brake seal, as explained in more detail further below.

Inside many typical disc brakes for trucks is a seal that separates the brake into brake application and brake cooling sections. Oil used in the brake application section for applying the brakes comes from the steering oil circuit and, in particular, from the steering accumulators which store oil at higher pressures. Due to the resulting pressure differential between the two sections when the brakes are applied, oil may leak from the brake application section to the brake cooling section across the brake seal. Over time this leakage can be significant and cause a decrease in the volume of oil in the steering oil circuit and an increase in the brake cooling oil circuit. If these two circuits are totally separated, as in the case where two totally separate hydraulic tanks are employed, then the oil that has leaked across the brake seal can not return to the steering oil circuit.

The present invention provides a single hydraulic tank which allows oil that has leaked across the brake seal from the brake application section to the brake cooling section to return to the steering circuit. While allowing "leaked" oil from the brake cooling section to return to the steering circuit, the present invention also prevents contaminants that may be present in the brake cooling oil from entering the steering circuit.

SUMMARY OF THE INVENTION

The present invention provides a hydraulic fluid tank assembly for use with a vehicle having a hydraulic brake cooling circuit and a hydraulic steering circuit. The hydraulic fluid tank assembly includes a brake cooling section having a supply port and a return port that may be fluidically coupled to the hydraulic brake cooling circuit of a vehicle in order to supply hydraulic fluid to and receive hydraulic fluid from the hydraulic brake cooling circuit.

The hydraulic fluid tank assembly further has a steering section that is fluidically coupled to the brake cooling section so that hydraulic fluid may flow between the brake cooling section and the steering section. The steering section also has a supply port and a return port that may be fluidically coupled to the hydraulic steering circuit of a vehicle in order to supply hydraulic fluid to and receive hydraulic fluid from the hydraulic steering circuit.

A hydraulic fluid strainer is disposed between the brake cooling section and the steering section, whereby the hydraulic fluid strainer strains hydraulic fluid that flows between the brake cooling section and the steering section.

In another aspect of the invention, the hydraulic fluid tank assembly comprises a single tank that houses a brake cooling section and the steering section. A barrier plate disposed in the tank separates the brake cooling section from the steering section. The barrier plate has a through hole that fluidically couples the brake cooling section with the steering section; and a hydraulic fluid strainer is disposed in the through hole of the barrier plate. Preferably, the hydraulic fluid strainer extends into the brake cooling section.

In still a further embodiment of the invention, the brake cooling section further has a second supply port and a second return port that may be fluidically coupled to the hydraulic hoist circuit of a vehicle in order to supply hydraulic fluid to and receive hydraulic fluid from the hydraulic hoist circuit.

The present invention also provides a vehicle that has a hydraulic brake cooling circuit and a hydraulic steering circuit and comprises a hydraulic fluid tank assembly. The hydraulic tank assembly includes a brake cooling section fluidically coupled to the hydraulic brake cooling circuit and a steering section fluidically coupled to the hydraulic steering circuit and to the brake cooling section. A hydraulic fluid strainer is disposed between the brake cooling section and the steering section such that the hydraulic fluid strainer strains hydraulic fluid that flows between the brake cooling section and the steering section.

BRIEF DESCRIPTION OF THE DRAWINGS

The above and other objects and advantages of the invention will become apparent from consideration of the following detailed description when read in conjunction with the accompanying drawings, in which like reference characters refer to like parts throughout, and in which:

FIG. 2 is a top view of the hydraulic tank assembly of the present invention;

FIG. 6 illustrates in schematic the hydraulic tank assembly of FIG. 2 and a portion of the steering fluid circuit, FIG. 7 illustrates in schematic the remaining portion of the steering hydraulic circuit including the steering cylinders and steering unit, FIG. 8 illustrates in schematic the brake cooling hydraulic circuit, and FIG. 9 illustrates in schematic the hoist hydraulic circuit;

DETAILED DESCRIPTION OF THE INVENTION

Figure 1:
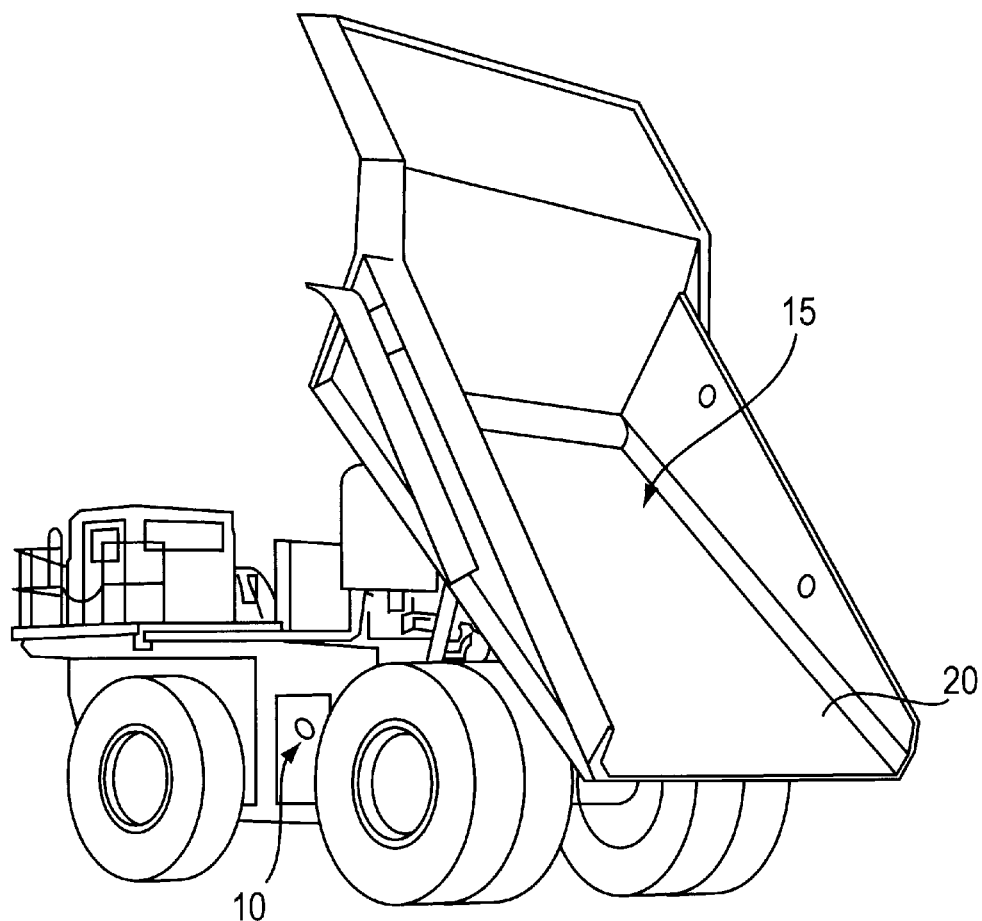
FIG. 1 is a perspective view of a dump truck with a hydraulic tank assembly in accordance with the present invention.

With reference to FIG. 1, a hydraulic tank assembly 10 is shown in accordance with the present invention mounted to a dump truck 15 having a bed or body 20 that may be raised or lowered. The hydraulic tank assembly 10 supplies and receives hydraulic fluid or oil to and from the hydraulic steering circuit, the hydraulic brake cooling circuit, and the hydraulic hoist circuit of the truck 15. Although the present invention is described herein in connection with a dump truck having both a brake and hoist system, the invention may also be employed in a different type of vehicle that has hydraulic steering, brake and hoist systems or in a vehicle that has hydraulic steering and brake systems but not a hoist system.

Figure 3:
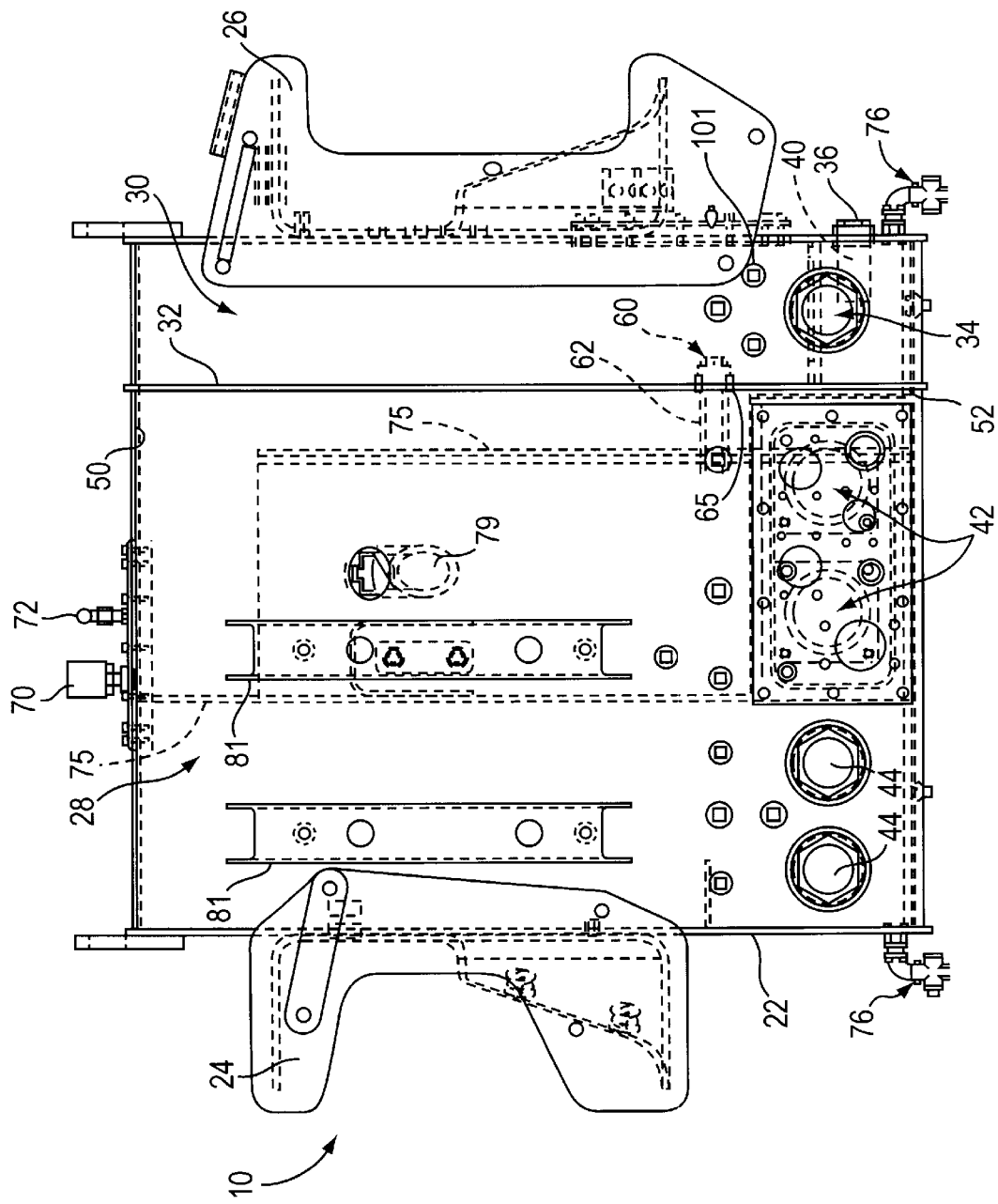
FIG. 3 is an end view of the hydraulic tank assembly of FIG. 2.
Figure 4:
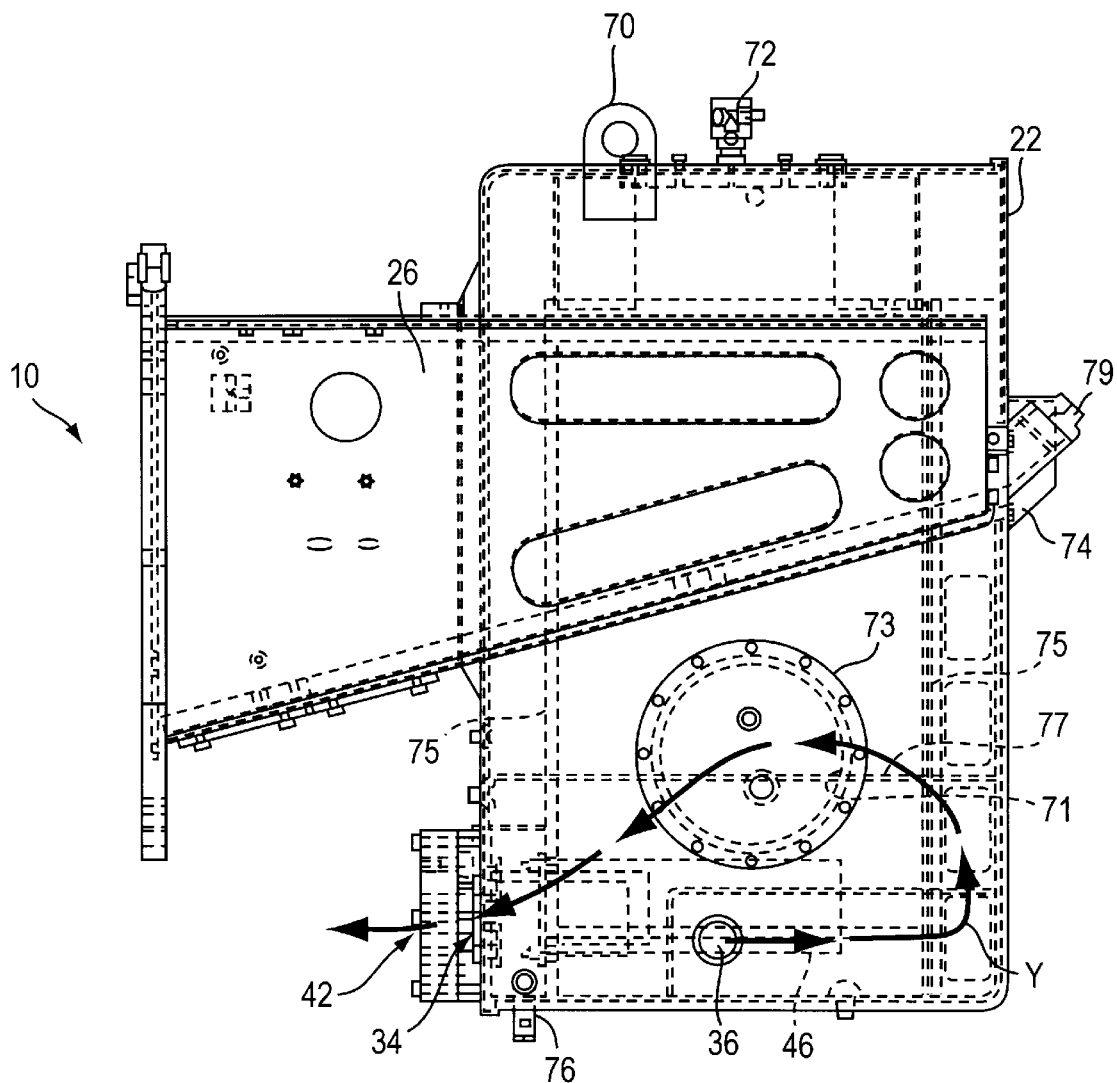
FIG. 4 is a side view of the hydraulic tank assembly of FIG. 2.

With reference to FIG. 2–4, the hydraulic tank assembly 10 comprises a rectangular box-shaped tank 22 that may be fluidically coupled to the steering hydraulic circuit (FIGS. 6 and 7), brake cooling hydraulic circuit (FIG. 8), and hoist hydraulic circuit (FIG. 9) of a vehicle such as a dump truck 15. Mounted to each side of the tank 22 are brackets 24, 26 for attaching the tank 22 to the truck. The interior chamber of the tank 22 is divided into two sections or subchambers 28, 30 by a barrier plate 32. The first section 28 is a brake cooling/hoist section, and the second section 30 is a steering section.

The steering section 30 is provided with a supply port 34 for supplying hydraulic fluid or oil to the steering hydraulic circuit and a return port 36 for receiving hydraulic oil from the steering hydraulic circuit. Coupled to the supply port 34 is a suction strainer 38 for filtering contaminants from the hydraulic oil before it enters the steering circuit, and coupled to the return port 36 is a diffuser 40.

The brake cooling/hoist section 28 is provided with supply ports 42 for supplying hydraulic fluid or oil to both the brake cooling hydraulic circuit and the hoist hydraulic circuit of the vehicle. Return ports 44 are adapted to receive hydraulic oil from the brake cooling and hoist circuits. Coupled to the supply ports 42 are suction strainers 46 for filtering the hydraulic oil before it enters either the brake cooling or hoist hydraulic circuits, and coupled to the return ports 44 are diffusers 48.

The barrier plate 32 dividing the two sections 28 and 30 extends from the top 50 to the bottom 52 of the interior of the tank 22 as shown in FIG. 3 and from end 54 to end 56 as shown in FIG. 2. In addition, the barrier plate 32 has an opening or through hole 58 fluidically coupling the two sections 28 and 30. An internal hydraulic fluid or oil strainer 60, however, is disposed in the opening 58 in order to strain hydraulic fluid that may move between the brake cooling/hoist section 28 and the steering section 30 through the opening 58 in barrier plate 32.

Figure 5:
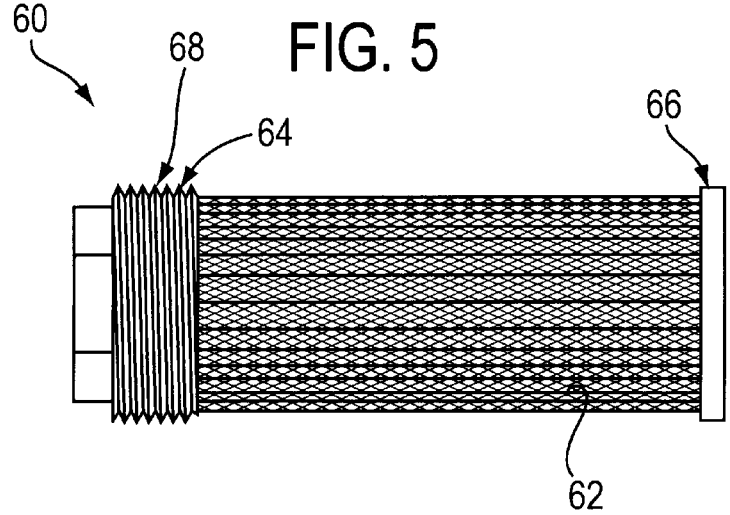
FIG. 5 is a side view of an hydraulic fluid strainer forming part of the hydraulic tank assembly of FIG. 2.

The oil strainer 60 may be a mesh-type strainer or filter such as a model number TF-1015-0 tank filter available from Zinga Industries of Reedsburg, Wis. FIG. 5 illustrates in greater detail the TF-1015-0 oil filter 60. The oil filter 60 comprises a standard 100 mesh "cleanable" stainless steel cloth 62 that has been rolled into the shape of a cylinder and disposed between two die cast aluminum bushings and end covers 64, 66. One end cover 64 is provided with male threads 68 for fitting the strainer 60 to a port or other opening.

A pipe coupling 65 having internal female threads is preferably welded or otherwise attached to the barrier wall 32 about the opening 58. The oil strainer 60 may accordingly be threaded to the pipe coupling 65. As shown in FIG. 2, the oil strainer 60 is preferably mounted to the barrier plate 32 so that the cylindrical mesh cloth 62 extends into the brake cooling/hoist section 28 of the tank 22.

With the oil strainer 60 so positioned, the strainer 60 can effectively prevent contaminants that may be present in the brake cooling/hoist section 28 of the tank from entering the steering section 30 and thus provide additional protection for the steering hydraulic circuit against contamination. As explained in more detail below, the flow of oil between the two sections is primarily from the brake cooling/hoist section 28 to the steering section 30. The strainer 60, however, can function in two directions. Furthermore, although the cylindrical mesh cloth 62 is described herein as having a 100 mesh, it may have a smaller or larger mesh configuration depending upon the degree of filtering needed or desired.

With further reference to FIG. 2–4, coupled to the tank 22 are other known hydraulic tank assembly components such as a breather 70, a nipple short and blow down valve 72, gauge sight 74, drain cocks and nipples 76, a stiffener plate 77 to strengthen the structure, a failure neck 79, and hoist valve mounts 81. Access openings 71 in both the top and side of the tank provide access to inside the tank 22 so that the submerged oil strainer 60 may be serviced. The openings 71 are covered by access covers 73.

Several baffles 75 have been placed in the tank 22 to help control the flow of hydraulic oil in the tank 22. The baffles help direct the oil through the sections 28 and 30 of the tank along paths that result in a longer tank dwell time for the oil. See arrows X, FIG. 2, for brake cooling section 28 flow path and arrows Y, FIG. 4, for the steering section 30 flow path.

Figure 6:
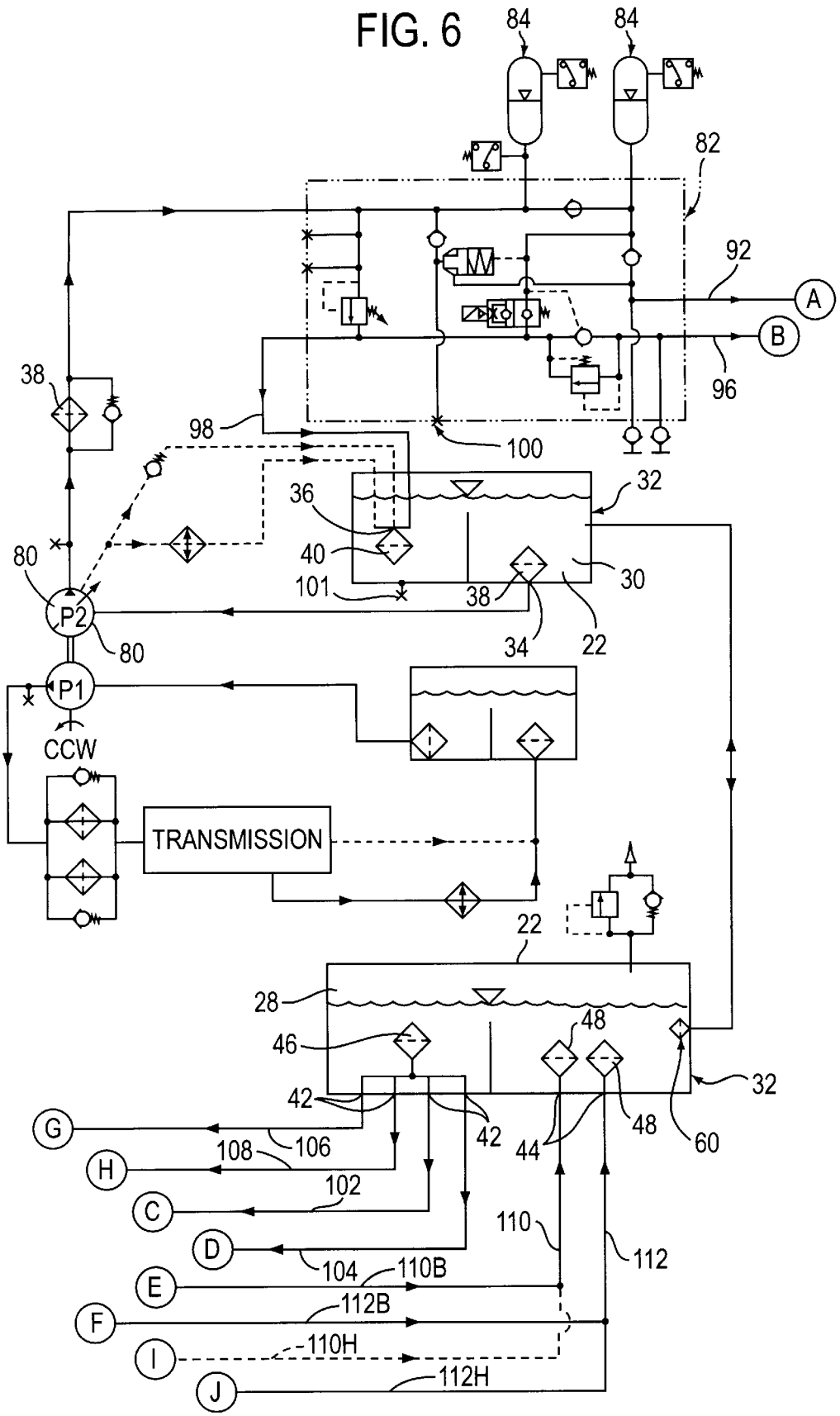
FIGS. 6–9 illustrate in schematic the hydraulic fluid system for the brake cooling, steering and hoist circuits of a dump truck that employs the hydraulic tank assembly of FIG. 2, in particular.

FIG. 6–9 illustrate the hydraulic circuit logic for the hydraulic steering circuit, hydraulic brake cooling circuit, and hydraulic hoist circuit. FIG. 6–9, in particular, illustrate the integration of the tank assembly 10 of the present invention into the hydraulic system of a dump truck such as model 530M dump truck available from Komatsu America International Company of Peoria, Ill. With reference to FIG. 6, the tank 22 of tank assembly 10 of the present invention is schematically shown with the steering section 30 and a brake cooling/hoist section 28 divided by a barrier plate 32. Hydraulic fluid is allowed to flow between the two sections 28, 30 through the internal oil strainer 60 mounted to the barrier plate 32.

The steering section 30 supplies hydraulic fluid or oil to the steering circuit via supply port 34. The hydraulic oil is delivered to a compensator 80 which in turn delivers the hydraulic oil at a high pressure to a bleed down manifold 82.

Figure 7:
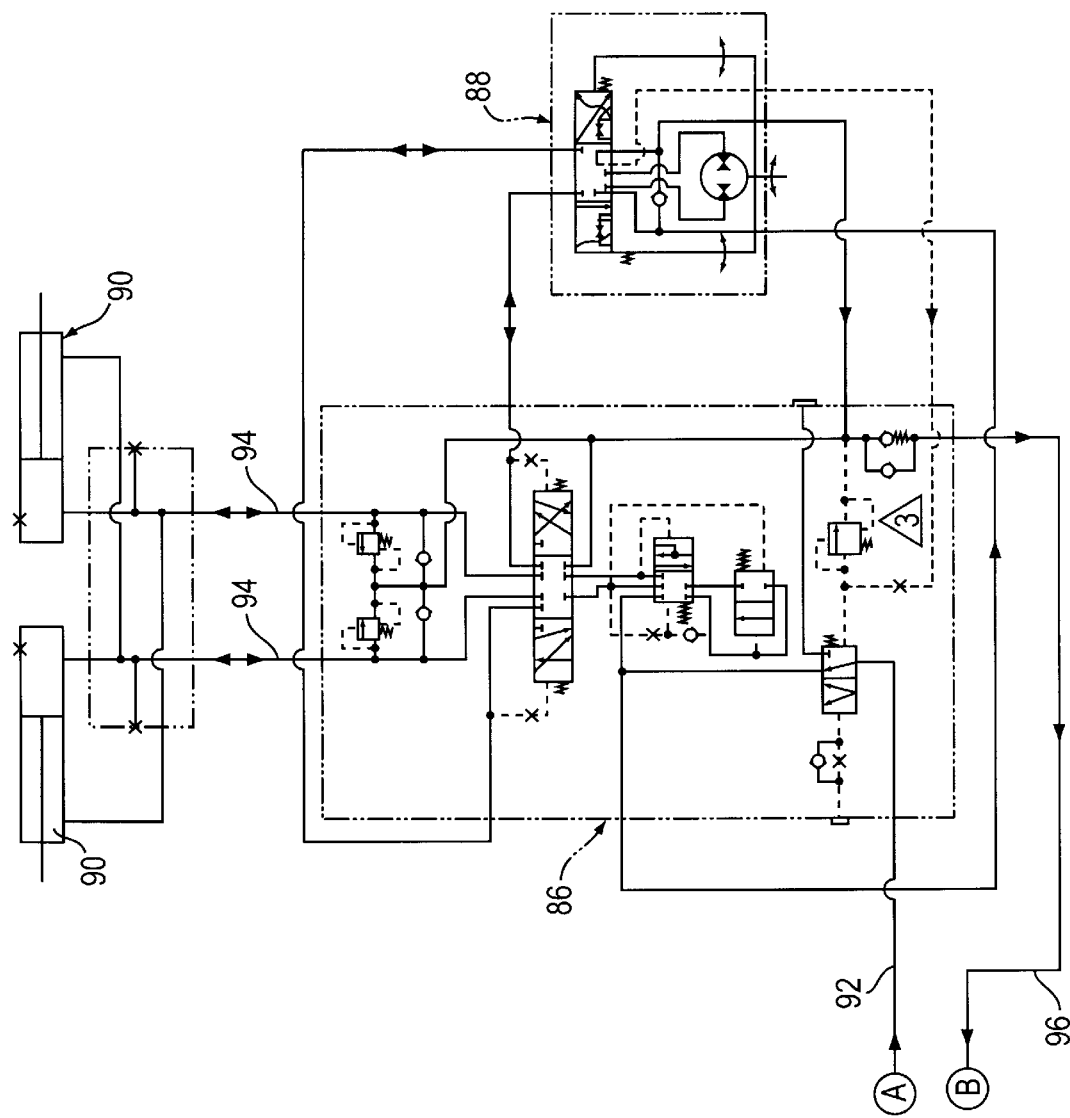

The bleed down manifold 82 is fluidically coupled to a pair of steering accumulators 84, which store hydraulic fluid at high pressure, and to a Dan Foss flow amplifier 86 (FIG. 7). With reference to FIG. 7, the flow amplifier 86 is also fluidically coupled to a Dan Foss steering unit 88 and to the steering cylinders 90 of the truck. The bleed down manifold 82, accumulators 84, flow amplifier 86, steering unit 88 and steering cylinders 90 all operate in a known manner to control the steering of the truck.

Hydraulic oil flows from the bleed down manifold 82 to the flow amplifier 86 via hydraulic line 92 where the oil may then be selectively delivered to the steering cylinders 90 through flow lines 94. Hydraulic oil leaving the steering cylinders 90 may return to the steering section 30 of the tank 22 through hydraulic lines 94, flow amplifier 86, hydraulic line 96, bleed down manifold 82, and return line 98. Return line 98 is fluidically coupled to the return port 36 of the steering section 30.

As shown in FIGS. 6 and 7 and described above, hydraulic fluid flows between the steering section 30 of the tank 22 and the steering cylinders 90 in a substantially closed circuit. However, as explained in more detail further below, high pressure hydraulic oil from the steering accumulators 84 is also used in the brake application circuit in order to apply the brakes. When the brakes are applied, the high pressure oil is delivered to the brake application circuit (not shown) of well known configuration via a brake supply port 100 in the bleed down manifold 82 (FIG. 6). When the brakes are released, the oil returns to the steering section 30 of the tank 22 through brake application return port 101 and, thereby, returns to the steering circuit.

With further reference to FIG. 6, the supply ports 42 of the brake cooling/hoist section 28 of the tank 22 are fluidically coupled to respective supply lines 102, 104, 106, and 108. Supply lines 102, 104 are part of the brake cooling circuit (FIG. 8), and supply lines 106, 108 are part of the hoist circuit (FIG. 9). Return lines 110, 112, 110B, 112B, 110H, and 112H return hydraulic oil from the brake cooling and hoist circuits to the return ports 44 of the brake cooling/hoist section 28.

Figure 8:
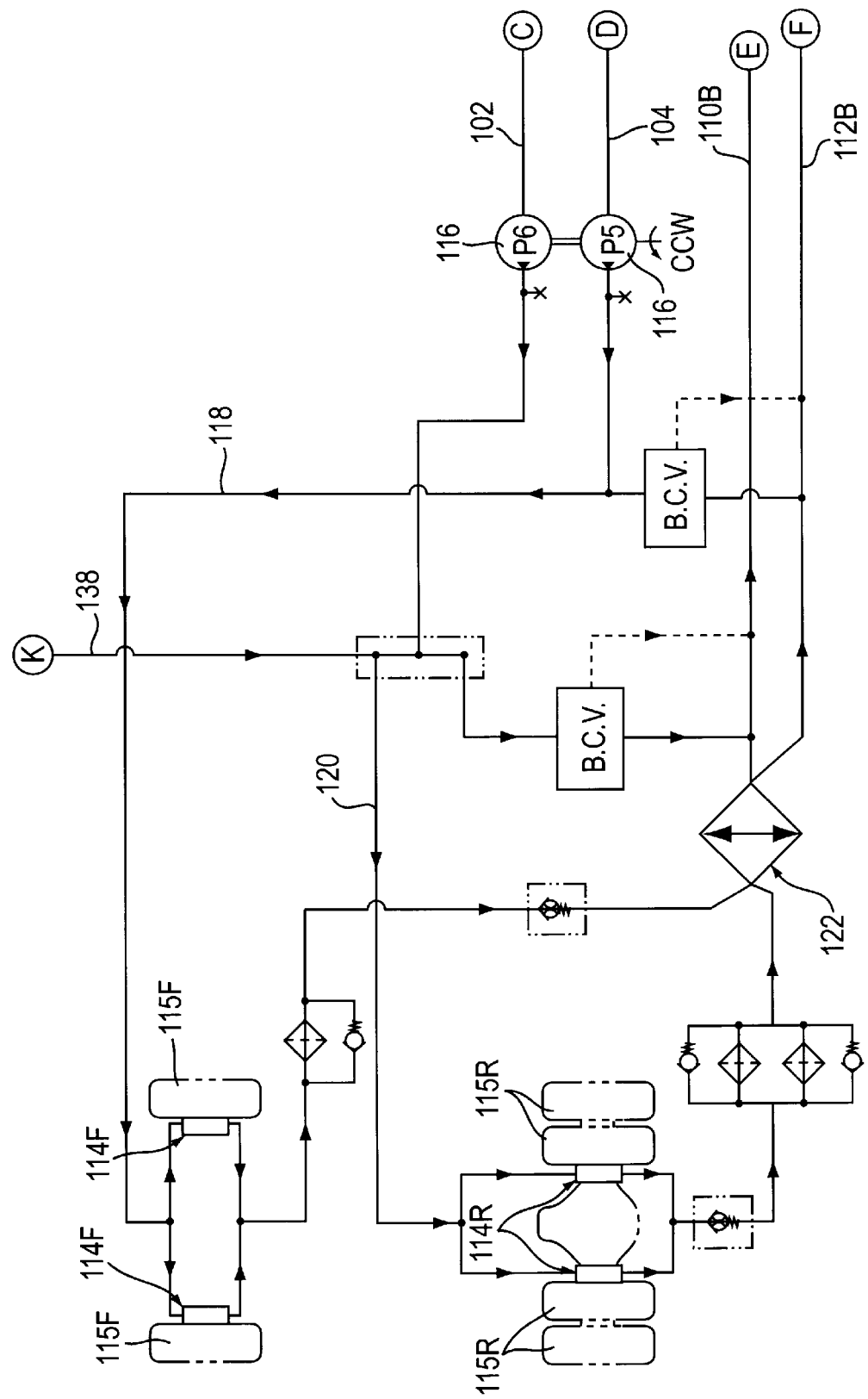
Figure 9:
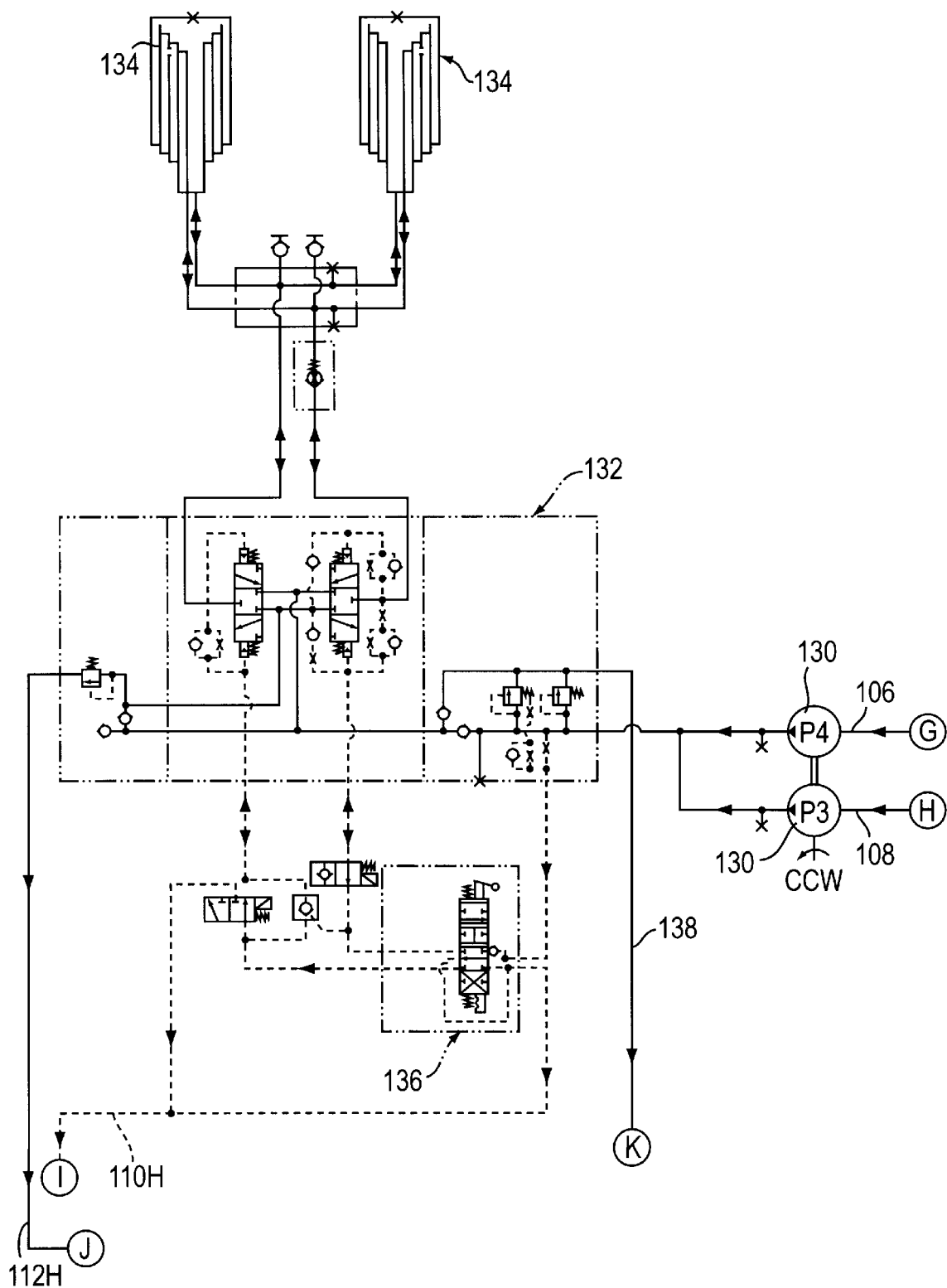
Figure 10:
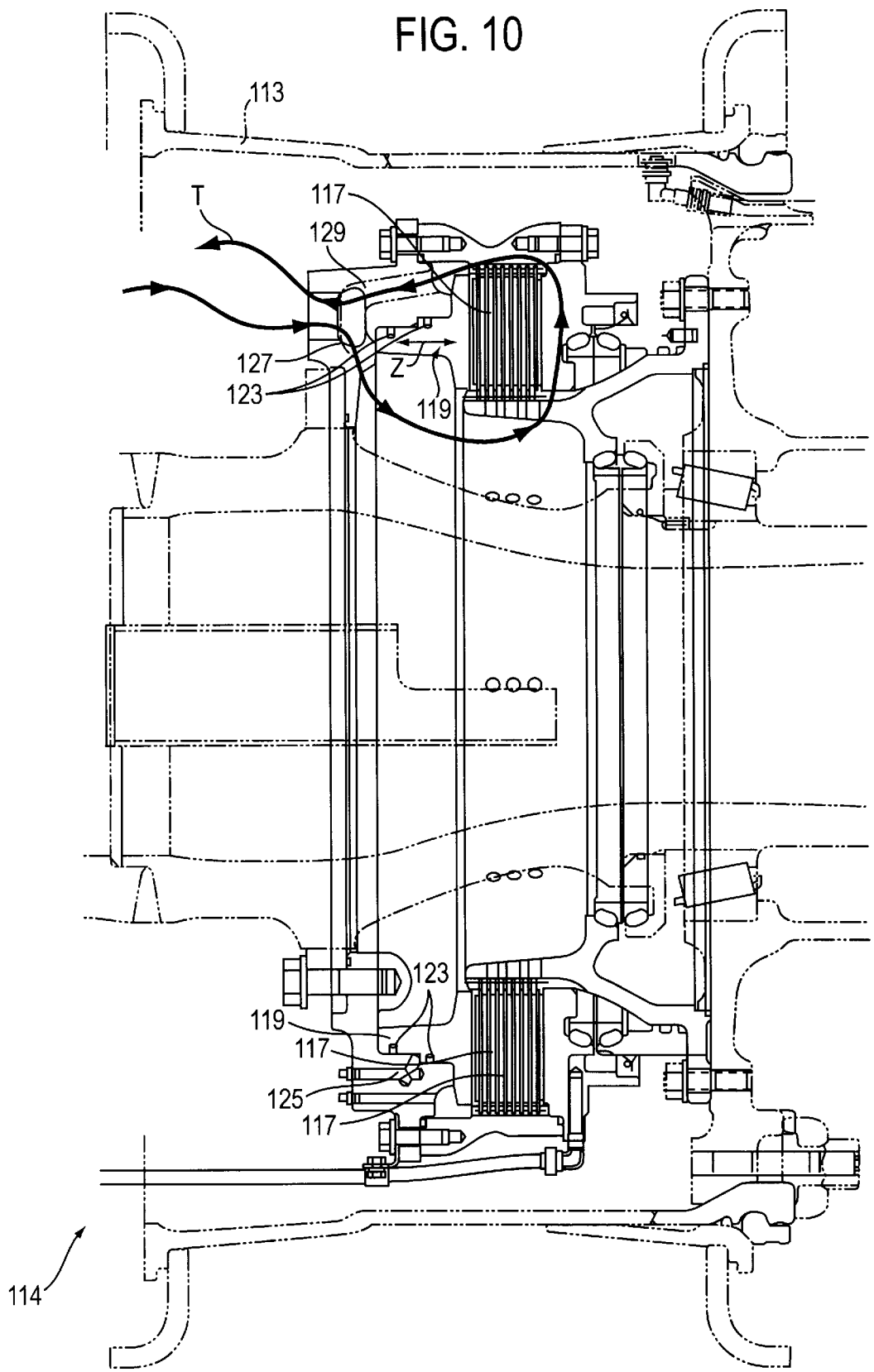
FIG. 10 is a cross-sectional view of a disc brake illustrating the brake application and brake cooling sections of the brake.
Figure 11:
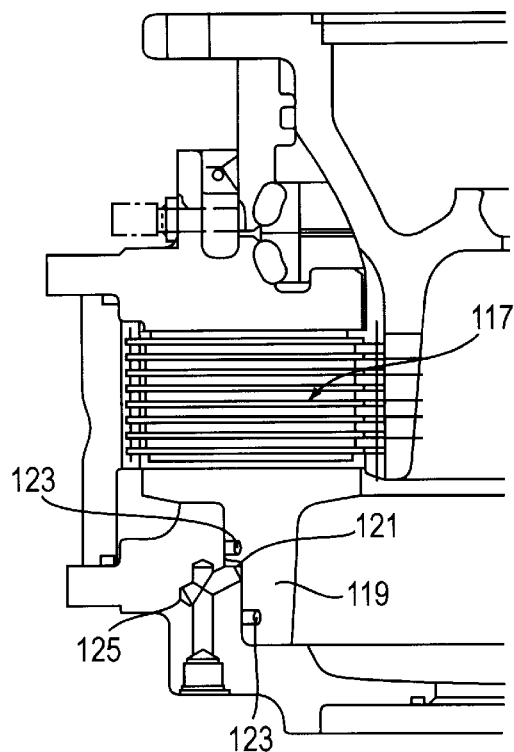
FIG. 11 is an enlarged portion of the cross-sectional view of the disc brake of FIG. 10 illustrating the seals between the brake application and brake cooling sections of the brake.
Figure 12:
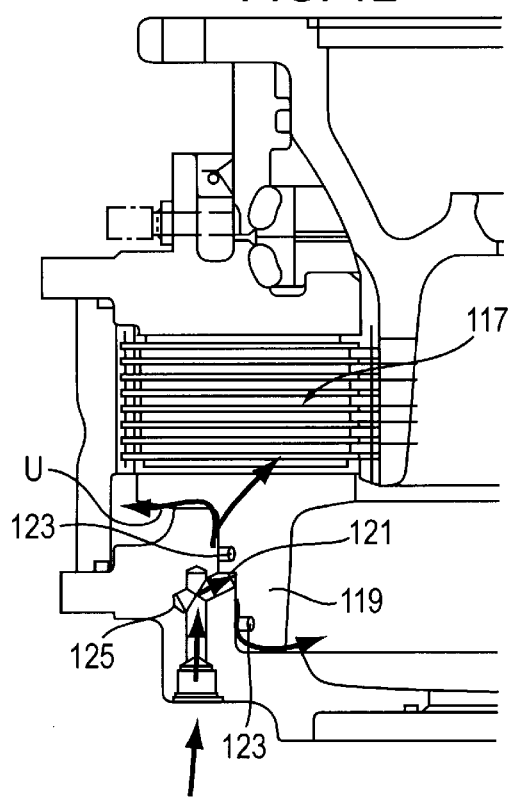
FIG. 12 is a similar to FIG. 11 except flow lines have been indicated.

FIG. 8 illustrates the brake cooling system of the truck 15. The truck has two wet disc brakes 114F for the front wheels 115F and two wet disc brakes 114R for the rear wheels 115R. The wet disc brakes 114F, 114R are well known disc brakes of the type having a brake application section and a brake cooling section that are separated by a seal. Such a disc brake is available from Komatsu, Ltd. of Tokyo, Japan. FIGS. 10–12 illustrate such a disc brake 114 coupled to a rotatable wheel 113.

With reference to FIGS. 10–12, the disc brake 114 comprises a plurality of interleaved discs 117, some of which are coupled to the rotatable wheel 113 and some of which are coupled to a non-rotating part of the assembly. A piston 119 selectively acts against the discs 117 to compress the stack of discs 115 together causing the non-rotating discs to stop the movement of the rotating discs. The piston 119 may slide back and forth in the direction of arrow Z in order to engage and disengage the brakes.

The piston 119 moves as a result of high pressure fluid from the steering accumulators acting against a shoulder 121 (FIG. 11) of the piston 119. Two O-ring seals 123 prevent the high pressure fluid from leaking past the shoulder 121 and throughout the rest of the brake 114. The region between the two seals 123 where the high pressure fluid is applied against the piston 119 defines the brake application section of the brake. The high pressure fluid enters the region through inlet 125.

Brake cooling fluid from the brake cooling/hoist section 28 of the tank 22 flows into the brake cooling section of the brake at an inlet 127 (FIG. 10). The brake cooling oil flows about the discs 117 picking up heat and exits from the brake through an outlet 129. Arrows T illustrate generally the flow of brake cooling fluid through the brake cooling section of the brake 114. The seals 123 separate the brake application section of the brake 114 from the brake cooling section of the brake.

As discussed further above, the brake application sections of the brakes 114R, 114F receive hydraulic fluid from the steering accumulators 84 via the brake application supply port 100 of the bleed down manifold 82. Hydraulic fluid exiting the brake application section returns to the steering section 30 of the tank 22 via brake application return port 101.

With reference to FIG. 8, the brake cooling sections of the brakes 114F, 114R receive cooling oil from the tank 22 via supply lines 102 and 104. The supply lines 102, 104 deliver cooling oil to a double pump 116 which pumps the cooling oil to the cooling sections of the front and rear discs 114F, 114R via supply lines 118, 120, respectively. The cooling oil returns to the brake cooling/hoist section 28 of the tank 22 after passing through a heat exchanger 122 and return lines 110B, 112B, 110, and 112.

When the brakes 114F, 114R are applied and the high pressure oil from the steering accumulators 84 is supplied to the brake application side of the brakes 114F, 114R, a pressure differential is created across the seals 123 separating the brake application and brake cooling sides of the brakes 114F, 114R. This pressure differential can cause hydraulic oil to leak across the seal from the brake application side to the brake cooling side as indicated by arrows U in FIG. 12. Overtime the loss of oil across the seal can cause a decrease in the volume of hydraulic oil in the steering circuit (where the "leaked" hydraulic fluid originated and where the fluid should have been returned).

With the present invention, however, the "leaked" oil is able to return to the brake cooling/hoist section 30 of the tank 22 with the brake cooling oil and transfer back to the steering circuit through the internal oil strainer 60. The increase in the volume of brake cooling oil due to the "leaked" oil causes an increase in the level of oil in the brake cooling/hoist section 28, which in turn causes the oil to flow through the opening in the barrier plate 32 to the steering section 30. The internal oil strainer 60, however, prevents contaminants in the brake cooling oil from entering the steering circuit.

Hydraulic oil primarily flows across the oil strainer 60 in a direction from the brake cooling/hoist section 28 to the steering section 30 except when the truck body or bed is being hoisted. During the hoisting of the truck bed 20, oil flows from the brake cooling/hoist section 28 to the hoist cylinders 134 as explained in more detail below. This causes a decrease in the level of oil in the brake cooling/hoist section 28 of the tank 22. Oil consequently will flow from the steering section 30 through the oil strainer 60 to the brake cooling/hoist section 28. The flow continues in a direction from the steering section 30 to the brake cooling/hoist section 28 until the level of the oil in both sections 28 and 30 is equal or the truck body 20 is lowered and the oil from the hoist cylinders 134 returns to the brake cooling/hoist section 30. When the oil returns from the hoist cylinders 134, the level of oil in the brake cooling/hoist section 28 increases causing the oil to flow back through the oil strainer 60 from the brake cooling section 28 to the steering section 28.

The flow of oil from the steering section 30 to the brake cooling/hoist section 28 when the truck body 20 is raised essentially acts to back flush the oil strainer 60 and keep it clean. Typically, the time involved in raising or lowering the truck body is approximately 30 seconds so that the back flush lasts approximately 30 seconds. Furthermore, a typical haul cycle is approximately three dumps per hour resulting in approximately three back flushes per hour.

With reference to FIG. 9, the brake cooling/hoist section 28 of the tank 22 is fluidically coupled to the hoist circuit of the truck. Hydraulic oil leaving the brake cooling/hoist section 28 through supply lines 106, 108 is delivered to a double pump 130 which pumps the oil to a Husco 6500 hoist valve 132. The hoist valve 132 regulates in a known manner the flow of hydraulic oil to and from hoist cylinders 134 and a hoist pilot valve 136. Hydraulic oil may return to the brake cooling/hoist section 28 of the tank 22 through return lines 110H, 112H, 110, 112. A hydraulic line 138 allows oil to flow from the hoist valve 132 to the brake cooling circuit (FIG. 8).

While only one embodiment of the invention has been shown and described, it should be recognized that other variations, substitutions, or modifications will occur to those skilled in the art. Any such variations, substitutions, and modification are intended to fall within the scope of the invention as defined in the appended claim.

What is claimed is:

1. A hydraulic fluid tank assembly for use with a vehicle having a hydraulic brake cooling circuit and a hydraulic steering circuit, comprising:
   a brake cooling section having a supply port and a return port that may be fluidically coupled to the hydraulic brake cooling circuit of a vehicle in order to supply hydraulic fluid to and receive hydraulic fluid from the hydraulic brake cooling circuit;
   a steering section having a supply port and a return port that may be fluidically coupled to the hydraulic steering circuit of a vehicle in order to supply hydraulic fluid to and receive hydraulic fluid from the hydraulic steering circuit, said steering section further being fluidically coupled to said brake cooling section such that hydraulic fluid may flow between said brake cooling section and said steering section; and
   a hydraulic fluid strainer disposed between said brake cooling section and said steering section such that said hydraulic fluid strainer strains hydraulic fluid that flows between said brake cooling section and said steering section.

2. The hydraulic fluid tank assembly of claim 1, further comprising a single tank that houses said brake cooling section and said steering section.

3. The hydraulic fluid tank assembly of claim 2, further comprising a barrier plate disposed in said tank separating said brake cooling section from said steering section, said barrier plate having a through hole that fluidically couples said brake cooling section with said steering section;
   wherein said hydraulic fluid strainer is disposed in said through hole of said barrier plate.

4. The hydraulic fluid tank assembly of claim 3, wherein said hydraulic fluid strainer extends into said brake cooling section.

5. The hydraulic fluid tank assembly of claim 1, wherein said brake cooling section further has a second supply port and a second return port that may be fluidically coupled to the hydraulic hoist circuit of a vehicle in order to supply hydraulic fluid to and receive hydraulic fluid from the hydraulic hoist circuit.

6. A hydraulic fluid tank assembly for use on a vehicle having a hydraulic brake cooling circuit and a hydraulic steering circuit, comprising:
   a tank having an interior chamber;
   a barrier plate disposed in said interior chamber of said tank, said barrier plate dividing said interior chamber into a brake cooling subchamber and a steering subchamber, said barrier plate further having a through hole that fluidically couples said brake cooling subchamber with said steering subchamber; and
   a hydraulic fluid strainer positioned in said through hole of said barrier plate such that said hydraulic fluid strainer strains hydraulic fluid that flows between said brake cooling subchamber and said steering subchamber;
   wherein said brake cooling subchamber has a first supply port adapted to be fluidically coupled to a brake cooling circuit of a vehicle in order to supply hydraulic fluid to the brake cooling circuit, and a first return port adapted to be fluidically coupled to the brake cooling circuit of the vehicle in order to receive hydraulic fluid from the brake cooling circuit; and
   wherein said steering fluid subchamber has a supply port adapted to be fluidically coupled to a steering circuit of the vehicle in order to supply hydraulic fluid to the steering circuit and a return port adapted to be fluidically coupled to the steering circuit in order to receive hydraulic fluid form the steering circuit.

7. The hydraulic fluid tank assembly of claim 6, wherein said hydraulic fluid strainer is a mesh-type strainer.

8. The hydraulic fluid tank assembly of claim 6, wherein said hydraulic fluid strainer extends into said brake cooling subchamber of said tank.

9. The hydraulic fluid tank assembly of claim 6, wherein said brake cooling subchamber further has a second supply port adapted to be fluidically coupled to a hydraulic hoist circuit of a vehicle in order to supply hydraulic fluid to the hoist circuit and a second return port adapted to be fluidically coupled to the hoist circuit in order to receive hydraulic fluid from the hoist circuit.

10. A vehicle having a hydraulic brake cooling circuit and a hydraulic steering circuit, comprising:
    a hydraulic fluid tank assembly comprising:
       a brake cooling section fluidically coupled to said hydraulic brake cooling circuit,
       a steering section fluidically coupled to said hydraulic steering circuit and to said brake cooling section, and
       a hydraulic fluid strainer disposed between said brake cooling section and said steering section such that said hydraulic fluid strainer strains hydraulic fluid that flows between said brake cooling section and said steering section.

11. The vehicle of claim 10, wherein said hydraulic fluid tank assembly further comprises a single tank that houses said brake cooling section and said steering section.

12. The vehicle of claim 11, wherein said hydraulic fluid tank assembly further comprises a barrier plate, disposed in said tank, that separates said brake cooling section from said steering section, said barrier plate having a through hole that fluidically couples said brake cooling section with said steering section;
    wherein said hydraulic fluid strainer is disposed in said through hole of said barrier plate.

13. The vehicle of claim 10, wherein said hydraulic fluid strainer extends into said brake cooling section.

14. The vehicle of claim 10, wherein said brake cooling section has a supply port and a return port fluidically coupled to said hydraulic brake cooling circuit in order to supply hydraulic fluid and receive hydraulic fluid from said hydraulic brake cooling circuit; and wherein said steering section has a supply port and a return port fluidically coupled to said hydraulic steering circuit in order to supply hydraulic fluid and receive hydraulic fluid from said hydraulic steering circuit.

15. The vehicle of claim 10, wherein said vehicle further has a hydraulic hoist circuit and said brake cooling section is fluidically coupled to said hydraulic hoist circuit.

16. The vehicle of claim 15, wherein said brake cooling section has a first supply port and a first return port fluidically coupled to said hydraulic brake cooling circuit in order to respectively supply hydraulic fluid and receive hydraulic fluid from said hydraulic brake cooling circuit;

wherein said brake cooling section has a second supply port and a second return port fluidically coupled to said hydraulic hoist circuit in order to respectively supply hydraulic fluid and receive hydraulic fluid from said hydraulic hoist circuit; and wherein said steering section has a supply port and a return port fluidically coupled to said hydraulic steering circuit in order to respectively supply hydraulic fluid and receive hydraulic fluid from said hydraulic steering circuit.

17. A dump truck having a hydraulic brake cooling circuit, a hydraulic hoist circuit, and a hydraulic steering circuit, said dump truck comprising:

a hydraulic fluid tank having a brake cooling and hoist subchamber fluidically coupled to said hydraulic brake cooling circuit and fluidically coupled to said hydraulic hoist circuit and a steering subchamber fluidically coupled to said hydraulic steering circuit;

a barrier plate disposed in said hydraulic fluid tank separating said brake cooling and hoist subchamber from said steering subchamber, said barrier plate having a through hole fluidically coupling said brake cooling and hoist subchamber and said steering subchamber; and a hydraulic fluid strainer disposed in said through hole of said barrier plate such that said hydraulic fluid strainer strains hydraulic fluid that flows between said brake cooling and hoist subchamber and said steering subchamber.

18. A method of separating steering hydraulic fluid and brake cooling hydraulic fluid within a hydraulic tank, comprising the following steps:

supplying hydraulic fluid from a brake cooling side of a hydraulic tank to a brake cooling hydraulic circuit of a vehicle;

returning hydraulic fluid from said brake cooling circuit to said brake cooling side of said hydraulic tank;

supplying hydraulic fluid from a steering side of said hydraulic tank to a steering hydraulic circuit of said vehicle;

returning hydraulic fluid from said steering hydraulic circuit to said steering side of said hydraulic tank;

allowing hydraulic fluid to flow between said brake cooling side of said hydraulic tank and said steering side of said hydraulic tank; and straining the hydraulic fluid that flows between said brake cooling side and said steering side of said hydraulic tank.

19. The method of claim 18, further comprising the step of substantially separating said brake cooling side of said hydraulic tank from said steering side of said hydraulic tank.

* * * * *